United States Patent [19]

Fukasawa et al.

[11] Patent Number: 4,563,606

[45] Date of Patent: Jan. 7, 1986

[54] ELECTRIC ROTARY MACHINE WITH TOROIDAL WINDINGS ON AN ANNULAR STATOR CORE

[75] Inventors: Iko Fukasawa, Hitachi; Yuji Kumagai, Ibaraki, both of Japan

[73] Assignee: Hitachi, Ltd., Tokyo, Japan

[21] Appl. No.: 513,423

[22] Filed: Jul. 13, 1983

[30] Foreign Application Priority Data

Jul. 14, 1982 [JP] Japan .................... 57-121179

[51] Int. Cl.⁴ .................... H02K 3/28; H02K 23/26
[52] U.S. Cl. .................... 310/208; 310/43; 310/164; 310/179; 310/218
[58] Field of Search .................... 310/43, 45, 181, 192, 310/194, 216, 218, 254, 258, 259, 267, 268, 49 R, 179, 208, 42

[56] References Cited

U.S. PATENT DOCUMENTS

| | | | |
|---|---|---|---|
| 3,339,097 | 8/1967 | Dunn | 310/194 |
| 3,956,651 | 5/1976 | Brammerlo | 310/218 |
| 4,103,197 | 7/1978 | Ikegami et al. | 310/267 |
| 4,228,378 | 10/1980 | Humbert | 310/268 |
| 4,315,171 | 2/1982 | Schaeffer | 310/49 R |

FOREIGN PATENT DOCUMENTS 54-39859 3/1979 Japan .................... 310/208

Primary Examiner—Peter S. Wong
Assistant Examiner—D. L. Rebsch
Attorney, Agent, or Firm—Antonelli, Terry & Wands

[57] ABSTRACT

An electric rotary machine provided with a toroidal winding has a stator core made of annular punched seamless laminations. Insulation members, each having partition plates, are mounted on the stator core. Crossover conductor portions interconnecting unit coils of the toroidal winding are retained and guided by the partition plates. The unit coils in each of the slots formed in the stator core are wound by a single continuous electrical conductor, to yield a machine of highly improved performance.

9 Claims, 8 Drawing Figures

ELECTRIC ROTARY MACHINE WITH TOROIDAL WINDINGS ON AN ANNULAR STATOR CORE

BACKGROUND OF THE INVENTION

Field of the Invention

The present invention relates to an electric rotary machine having a stator provided with a toroidal winding and, more particularly, to a stator for an electric rotary machine which allows the stator winding to be formed in a convenient and facilitated manner.

In electric rotary machines of the aforementioned type, it has been proposed to construct the stator of the rotary machine by dividing an annular core into a plurality of arcuate cores or segments, and by inserting the windings tightly in slots formed in the arcuate cores with the aid of a flyer winding machine or by fitting magnetic pole pieces of the rotary machine with coils previously wound on a bobbin.

In either of the above mentioned proposed structures it is necessary to provide an interconnection between the individual coils, which, in turn, requires providing electrical insulation for the inter-coil connections.

Consequently, the construction of these previously proposed electrical rotary machines requires troublesome manufacturing procedures, and, since a relatively large number of the interconnections among the individual coils are required, there is a degradation in the quality or performance of the finished products.

SUMMARY OF THE INVENTION

It is a primary object of the present invention to form a plurality of individual unit coils wound on a stator of an electric rotary machine by a single continuous conductor.

Another object of the present invention resides in providing a stator of an electric rotary machine wherein a plurality of unit coils are wound continuously by a single conductor on a seamless stator core, originally formed as an annular core, through punching or the like process, which eliminates the connected portions of the core which have been inevitably present so as to prevent a degradation in the performance of the electric rotary machine due to leakage of the magnetic flux, while enhancing the dimensional accuracy and manufacturing efficiency as well as increasing the quality of the finished product.

A further object of the present invention resides in providing an electric motor of an improved quality which has a shock resistant capability, an improved heat dissipation, and reduction in a lower temperature increase.

According to advantageous features of the present invention, an electric rotary machine is provided wherein insulation members for electrically insulating the individual or unit coils of the stator from one another are mounted on the stator so that crossover conductor portions may be retained by the insulation members, with the individual unit coils being formed by continuously winding a single conductor in a predetermined direction. By virtue of the features of the present invention, the stator core may be originally formed as a seamless annular structure and the stator may be coated or molded with a synthetic resin.

DESCRIPTION OF THE PREFERRED EMBODIMENTS

Figure 4:
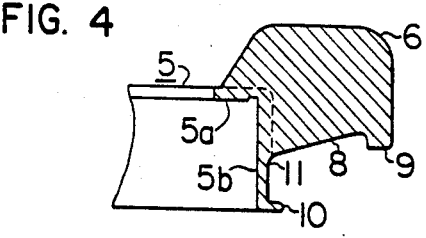
FIG. 4 is an axial cross-sectional view, on an enlarged scale, of an insulation member in the stator assembly according to the invention.

Referring now to the drawings, a reference number 1 denotes a cylindrical stator core having a plurality of slots formed in the inner surface or wall. The seamless stator core 1 is constituted by laminations, each punched originally in an annular form. The winding configuration includes slot liners 3, unit coils 4 wound in a toroidal form, and insulation member 5, having a plurality of radially disposed partition plates 6 which serve as retaining members for crossover conductor portions. The insulation member 5 is provided with a flat portion 5a brought into contact with the end face of the stator core 1 and a cylindrical portion 5b brought into contact with an outer peripheral portion of the stator core 1, coaxially with the latter, to serve for assuring electrical insulation between the core and the coils 4. The partition plates 6 serving for insulation purposes are disposed in a number corresponding to that of the slots in such orientation that they extend axially and radially, i.e. in the direction perpendicular to the flat end portion 5a and the cylindrical portion 5b of the insulation member 5. Each of the partition plates 6 is of such a structure that the crossover conductor portion 7 for electrically connecting one of the unit coils 4, each constituting a magnetic pole, to another unit coil, may extend and be guided by the partition plate 6 without being detached or moved away from the end face and the outer periphery of the stator core 1. The retaining function is accomplished by providing the partition plates with a configuration as shown in FIG. 4. More specifically, the partition plate 6 has an inclined surface 8, a projection 9 for retaining positively the crossover conductor portion 7 and a coil holding projection 10 for assuring the insulation space or distance between the stator core 1 and the unit coil 4. Further, an offset portion 11 is formed in the partition plate 6 to cooperate with the coil holding projection 10 for protecting the crossover conductor portion 7 from being subjected to an excessively large compression load applied by an auxiliary coil portion 4b when the latter is wound between a main coil portion 4a of the unit coil 4 and the magnetic pole.

When the induction motor of the construction mentioned above is to be assembled, the slot liners 3 are first disposed within the slots 2, respectively, formed in the stator core 1. Next, the insulation members 5 are disposed on both end faces of the core 1, respectively, in such orientation that each of the partition plates 6 is positioned between the adjacent slots 2 formed in the core 1 and then press-fitted onto the stator core 1. Subsequently, the main coil portions 4a are each wound with a predetermined number of turns in a predetermined direction within a slot 2 located at a predetermined position so that the assembled machine operates as the four-pole single-phase induction motor. Thus a toroidal coil is formed. In this connection, a method of winding a conductor in a toroidal form on a non-divided stator core as in the case of the invention is disclosed in Japanese Laid-Open Patent Application No. 39859/1979. When the main coil portion 4a of one unit coil has been formed within a given one of the slots after having been wound a predetermined number of turns, the conductor is then wound in the same direction along the slot located at a predetermined position relative to the given slot mentioned above. In this conjunction, it should be noted that the coils 4 located adjacent to each other are wound continuously by the single conductor with interposition of a space defined between the partition walls 6'. When one magnetic pole has been formed in this manner, the terminal end portion of the conductor of the unit coil 4 is retained on the associated partition plate 6 and another one of the partition plates 6 located in the vicinity of the slot along which the conductor is to be next wound with the predetermined number of turns in the direction opposite to that of the preceding coil.

Figure 1:
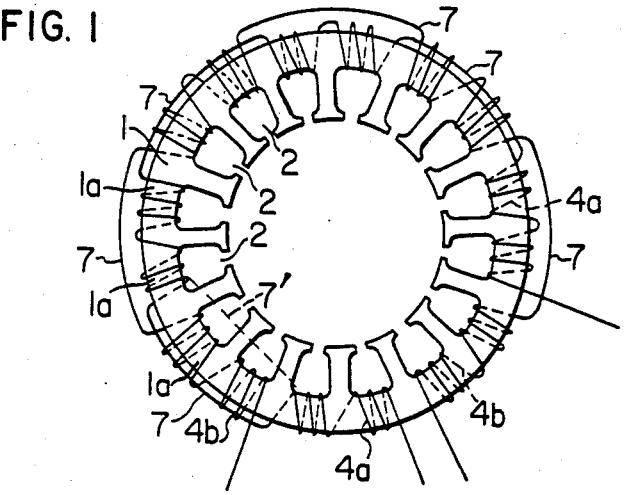
FIG. 1 is a schematic plan view of a completed stator winding according to one embodiment of the present invention.
Figure 2:
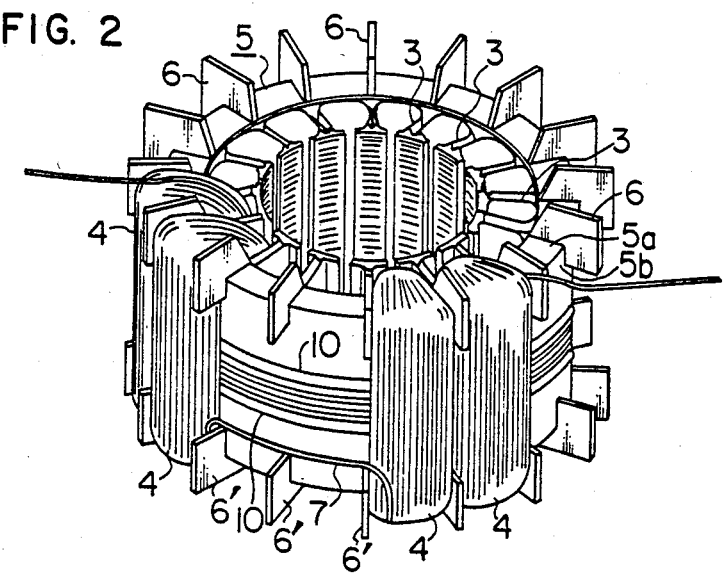
FIG. 2 is a perspective view of a stator in a state in which a main coil is being wound on the stator to be assembled according to the invention.

If the crossover conductor portion 7 extending between the unit coils forming the magnetic poles was not retained by the partition plates 6 upon winding the unit coils in the opposite directions alternately, the crossover conductor portion would extend linearly under tension between the slots 2, as indicated by a broken line 7' in FIG. 1, whereby the conductor portion 7' will be subjected to an excessively large tension upon winding the auxiliary coil, to be eventually broken, losing function as the conductor. The partition plate 6 serves for positioning the crossover conductor portion 7 so as to evade the difficulty mentioned above.

Figure 3:
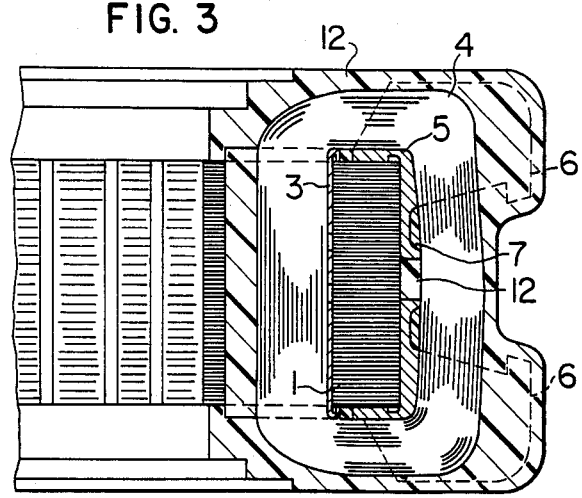
FIG. 3 is a fragmentary cross-sectional view of a resin-molded stator assembled in accordance with the invention.

The stator provided with the winding in the manner described above is, in most applications, provided in an insulated frame structure by molding with a thermosetting resin 12 in a mold, as shown in FIG. 3. The resin 12 is solidly filled within the space produced in the stator core 1, the stator coils 4, the insulation member 5 having the partition plates 6, the slot liners 3 and the crossover conductor 7. In this way, a stator having a solid structure is accomplished in which adequate insulation is assured in the stator core 1, the stator coil 4 and the crossover conductor 7, while mutual displacement of these components is positively prevented.

Figure 5:
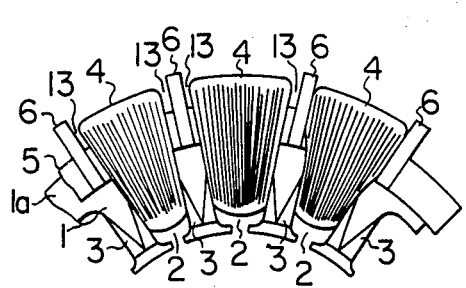
FIG. 5 is a plan view of a portion of the coils in the wound state.
Figure 6:
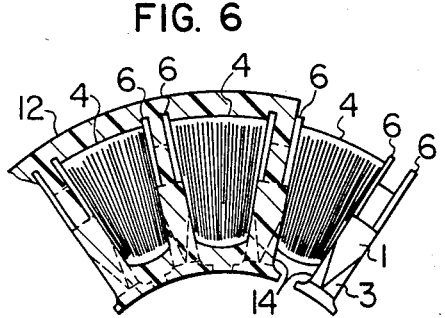
FIG. 6 is a plan view of a portion of the coils wound by using partition plates of a modified structure.

When the stator unit coil 4 is successively wound in the slots 2 around a yoke portion 1a, gaps 13 may be produced between the partition plates 6 and the stator unit coils 4, respectively, depending on differences in the number of turns and diameter of the winding conductor, as is shown in FIG. 5. In that case, it is of course conceivable that the stator unit coil 4 may undesirably be partially collapsed into the gap 13 under contacting pressure exerted upon handling or pressure of resin applied upon the resin molding, whereby the stator unit coil 4 is partially loosened to eventually contact the stator core 1, thus giving rise to failure with regard to the voltage withstanding performance. As a means for preventing this difficulty according to a further feature of the invention to dispose a pair of the partition plates 6 are disposed along the extensions of the side walls of each slot 2, as is shown in FIG. 6. With this arrangement, generation of the gaps 13 can be positively prevented, whereby the failure of the kind mentioned above can be obviated. Further advantages are also realized in that the resin can penetrate along the paired partition plates to reach the stator core 1 thereby increasing the rigidity of the frame structure of the stator while increasing the heat transfer function from the stator core 1 to the ambient air to assure an improved cooling performance. In addition, since the stator unit coils 4 are disposed independent of one another, the possiblity of dielectric breakdown due to the potential difference appearing between the unit coils can be significantly reduced.

Figure 7:
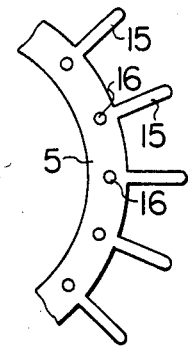
FIG. 7 is a plan view of a portion of the an insulation member constructed in accordance with the invention.
Figure 8:
FIG. 8 is a cross-sectional view of the insulation member of FIG. 7.

A simple and economical structure of the insulation member is illustrated in FIGS. 7 and 8. The insulation member is provided with retainer elements 15 for holding or positioning the crossover conductor portions upon forming the toroidal coils on the nonsegmented annular stator core through continuous winding of the single conductor in the alternately opposite directions. Reference numeral 16 denotes projections for physically separating the unit coils from one other.

In the foregoing, description has been made on the assumption that the invention is applied to the four-pole single-phase induction motor. However, it goes without saying that the present invention can equally be applied to various electric rotary machines of two poles, six poles, eight or more poles.

As will now be appreciated, by virtue of such arrangement that the insulation members 5, each having the partition plates 6 are, respectively, disposed at both ends of the non-segmented stator core 1 upon forming the coils of alternately opposite polarities by winding a conductor continuously, the crossover conductor portions 7 can be protected from being loosened or tensioned, whereby dielectric breakdown strength can be significantly increased between the adjacent unit coils. Further, the portion of the partition wall 6 extending outwardly in the axial and the radial direction from the wound coil serves to protect the stator winding, to improve the quality of the electric rotary machine. This feature allows the winding operation and the resin molding operation to be carried out with a significantly enhanced efficiency, involving low manufacturing costs and improved quality or performance. Thus, the present invention has made a significant contribution in the art.

We claim:
1. An electric rotary machine with a toroidal winding comprising a seamless annular stator core formed by a plurality of annular laminations, said stator core having a number of magnetic poles with slots being formed in said stator core between adjacent ones of said magnetic poles, a plurality of stator unit coils wound along respective ones of said slots in the outer periphery of said stator core, crossover conductor portions interconnecting said unit coils so that said unit coils can be successively wound by a single electrical conductor, and wherein insulation members are mounted on said stator core so that outer peripheral portions of said insulation members are wound with respective ones of said unit coils, said insulation members including means for re- taining said crossover conductor portions leading from said unit coils.

2. An electric rotary machine with a toroidal winding according to claim 1, wherein said insulation members include partition plates formed integrally therewith for insulating said unit coils from one another, said means for retaining including projections formed on said partition plates for retaining said crossover conductor portions.

3. An electric rotary machine with a toroidal winding includes an annular stator core having a number of magnetic poles, slots formed between adjacent ones of said magnetic poles, respectively, unit toroidal coils each wound along respective ones of said slots and outer periphery of said stator core, and crossover conductor portions for interconnecting said unit coils, wherein said stator core is constructed by non-divided annular core members having no end portion in a direction of their circumference, insulation members having flat portions covering end surfaces of said stator core and cylindrical portions covering outer peripheral wall of said stator core are put on both end portions of said stator core, partitions are disposed on outer sides of said flat portions and said cylindrical portions of said insulation members, said stator core and said insulation members are wound with said unit toroidal coils which are insulated from each other by said partitions, said crossover conductor portions leading from said unit toroidal coils are retained by said partitions on said insulation members, respectively, with said unit toroidal coils being successively wound by a single electric conductor.

4. An electric rotary machine according to claim 3, wherein a predetermined number of said unit toroidal coils are wound in one direction of turn and while the remaining number of said unit toroidal coils are wound in the opposite direction of turn.

5. An electric rotary machine according to claim 4, wherein each one of said partitions has projections for retaining said crossover conductor portions.

6. An electric rotary machine according to claim 3, wherein said each partition is constituted by a retainer element and/or projection.

7. An electric rotary machine according to claim 4, wherein said partitions are disposed at every boundary where said unit toroidal coils adjoin each other.

8. An electric rotary machine according to claim 4, wherein each of said partitions is constituted by a pair of plates.

9. An electric rotary machine having a stator assembly formed by a toroidal winding including an annular stator core having a number of magnetic poles, slots formed between adjacent ones of said magnetic poles, respectively, unit toroidal coils each wound along respective ones of said slots and outer periphery of said stator core, and crossover conductor portions for interconnecting said unit coils, wherein said stator core is constructed by non-divided annular core members having no end portion in a direction of their circumference, insulation members having flat portions covering end surfaces of said stator core and cylindrical portions covering outer peripheral wall of said stator core are put on both end portions of said stator core, partitions are disposed on outer sides of said flat portions and said cylindrical portions of said insulation members, said stator core and said insulation members are wound with said unit toroidal coils which are insulated from each other by said partitions, said crossover conductor portions leading from said unit toroidal coils are retained by said partitions on said insulation members, respectively, with said unit toroidal coils being successively wound by a single electrical conductor, said stator assembly being coated with a thermosetting resin.

* * * * *